THERMOPLASTIC FILM TAPE RECORDER

Original Filed Aug. 21, 1959

Inventors
William C. Hughes
John E. Wolfe
Richard J. Rieke
by Charles W. Helzer
Their Attorney Inventors
William C. Hughes
John E. Wolfe
Richard J. Rieke
by Charles W. Helzer
Their Attorney Inventors
William C. Hughes
John E. Wolfe
Richard J. Rieke
by Charles W. Helzer
Their Attorney Inventors
William C. Hughes
John E. Wolfe
Richard J. Rieke
by Charles W. Helzer
Their Attorney Inventors
William C. Hughes
John E. Wolfe
Richard J. Rieke
by Charles W Helzer
Their Attorney

United States Patent Office 3,283,310
Patented Nov. 1, 1966

3,283,310

THERMOPLASTIC FILM TAPE RECORDER

William C. Hughes, Scotia, John E. Wolfe, Schenectady, and Richard J. Rieke, Ithaca, N.Y., assignors to General Electric Company, a corporation of New York Original application Aug. 21, 1959, Ser. No. 835,210. Divided and this application Nov. 23, 1964, Ser. No. 413,103

8 Claims. (Cl. 340—173)

The present invention relates to a new and improved tape recorder and is a division of our copending U.S. application Serial No. 835,210, entitled "Thermoplastic Film Tape Recorder," filed August 21, 1959, and assigned to the General Electric Company, and now abandoned.

More particularly, the invention relates to tape recorders which employ an impressionable thermoplastic film tape upon which data can be recorded by electron writing, and from which data previously stored may be read out by electro-optical or other means.

The volume and complexity of data handling equipment for use by both industry and the military, have become so great in recent years that considerable effort is being expended to develop better recorders for use with such equipment. Because of the large volume of data to be handled by such equipment, and because the data to be recorded is in both analog and digital form, it is necessary that the recorders be readily adapted to both digital and analog recording, and that the recorder have a relatively large capacity to store information which in turn requires large packing densities in the data recorded. It is also necessary that the recorder make a good quality reproduction of the data recorded, and it must provide the data within reasonable access time periods.

It is therefore, a primary object of the present invention to provide a new and improved tape data recorder upon which data can be recorded by electron writing, and from which previously recorded data can be read out by electro-optical or other means; and which can be readily adapted to both digital and analog recording.

Another object of the invention is to provide a new and improved tape data recorder of the above type which employs a novel technique of transverse recording to achieve a high packing density in comparison to currently known recorders, and hence, has a large recording capacity in contrast to its size.

Still another object of the invention is to provide a new and improved tape data recorder having the above set forth characteristics wherein the quality of reproduction of the recorded data is excellent, and which is capable of recording at high frequencies.

A still further object of the invention is to provide a new and improved random access tape data recorder of the above type which has relatively fast access time in comparison to the volume of data which it stores.

In practicing the invention, a new and improved tape data recorder is provided which includes in combination a tape of solid impressionable medium, and an electron beam writing apparatus for impressing electrons on the tape in desired intelligence conveying patterns comprised by a series of spaced apart marks extending along the tape transverse to the longitudinal axis of the tape. This means further includes modulating means for laterally modulating the sides of the transversely extending series of spaced apart marks. Tape drive means are also provided for moving the tape at least in the direction of its longitudinal axis, and for accurately positioning any desired point along the tape with respect to the electron writing apparatus. Preferred embodiments of the recorder will also include a heating means for conditioning the impressionable plastic tape to accept the electron patterns, and for curing the tape after impression of the electron patterns thereon to permanently set the patterns thereby to form light modifying marks or gratings on the tape. It is also desirable that the tape recorders include a readout means for inspecting portions of the impressionable tape having light modifying marks formed thereon in intelligence conveying patterns, and for deriving an output electrical signal indicative of such intelligence.

Other objects, features and many of the attendant advantages of this invention will be appreciated more readily as the same becomes better understood by reference to the following detailed description, when considered in connection with the accompanying drawings wherein like parts in each of the several figures are identified by the same reference character and wherein.

Figure 4:
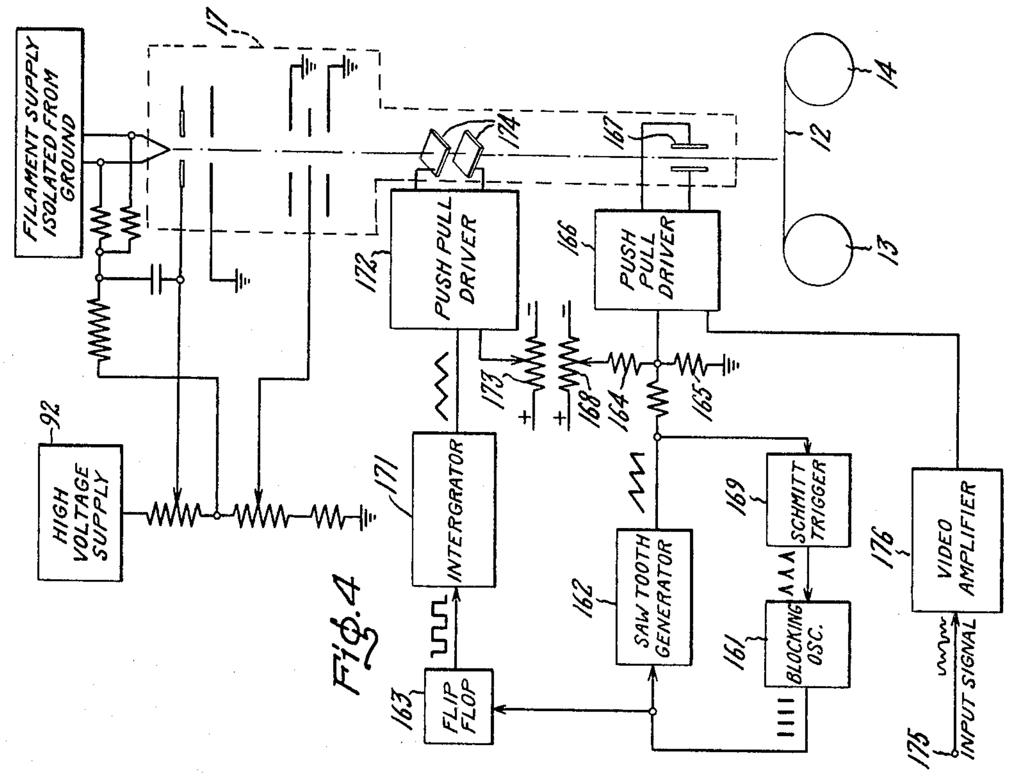
FIGURE 4 is a functional block diagram of the writing circuitry used to achieve transverse recording with the electron beam writer employed in the new and improved tape data recorder.
Figures 6A, 6B, 6C, 7:
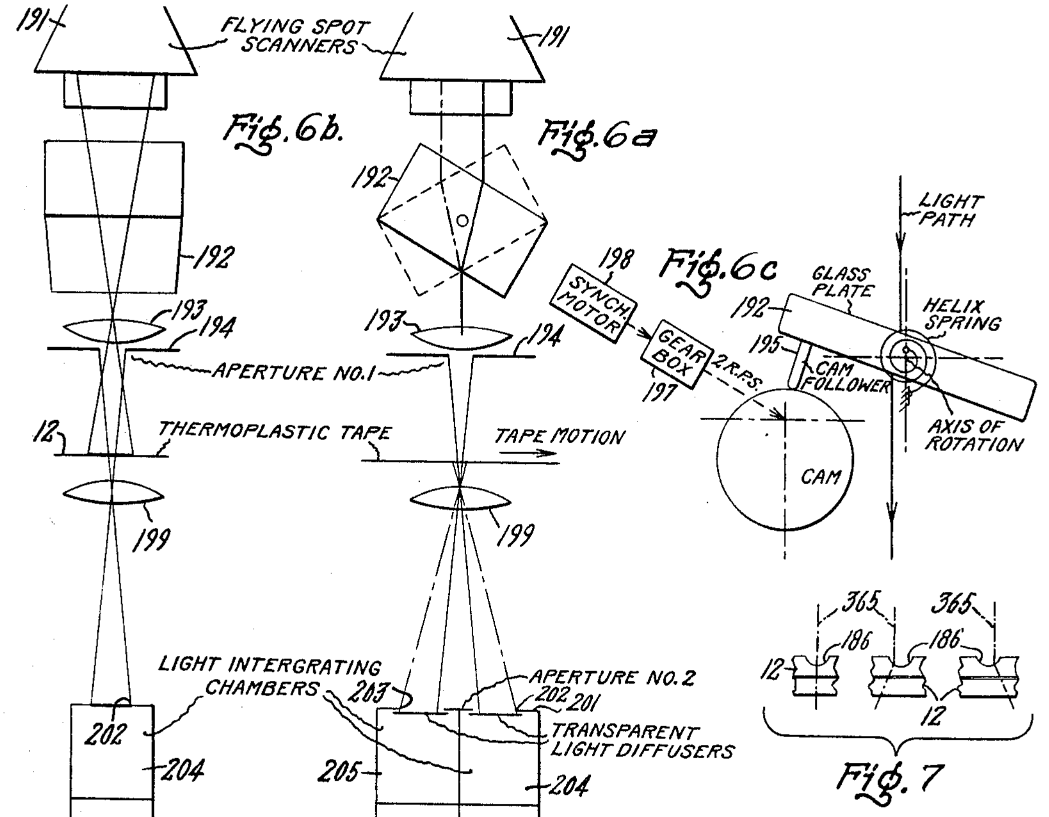
Figure 9:
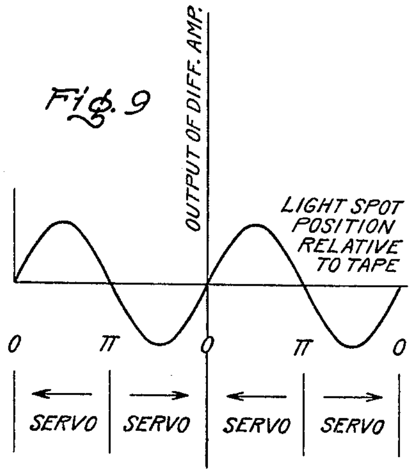
Figure 8:
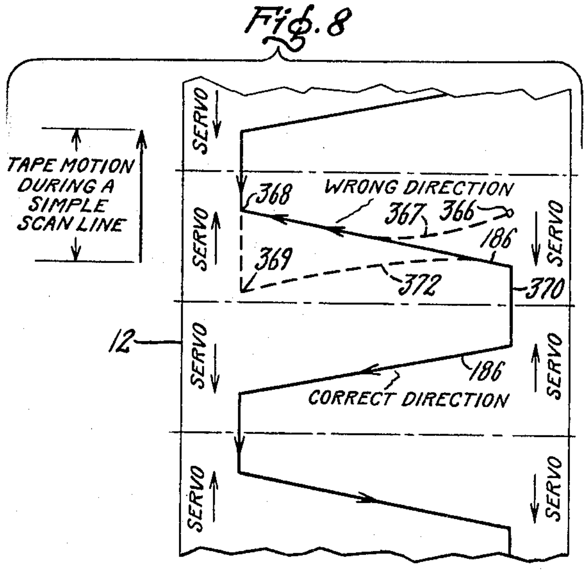
Figures 10, 11:
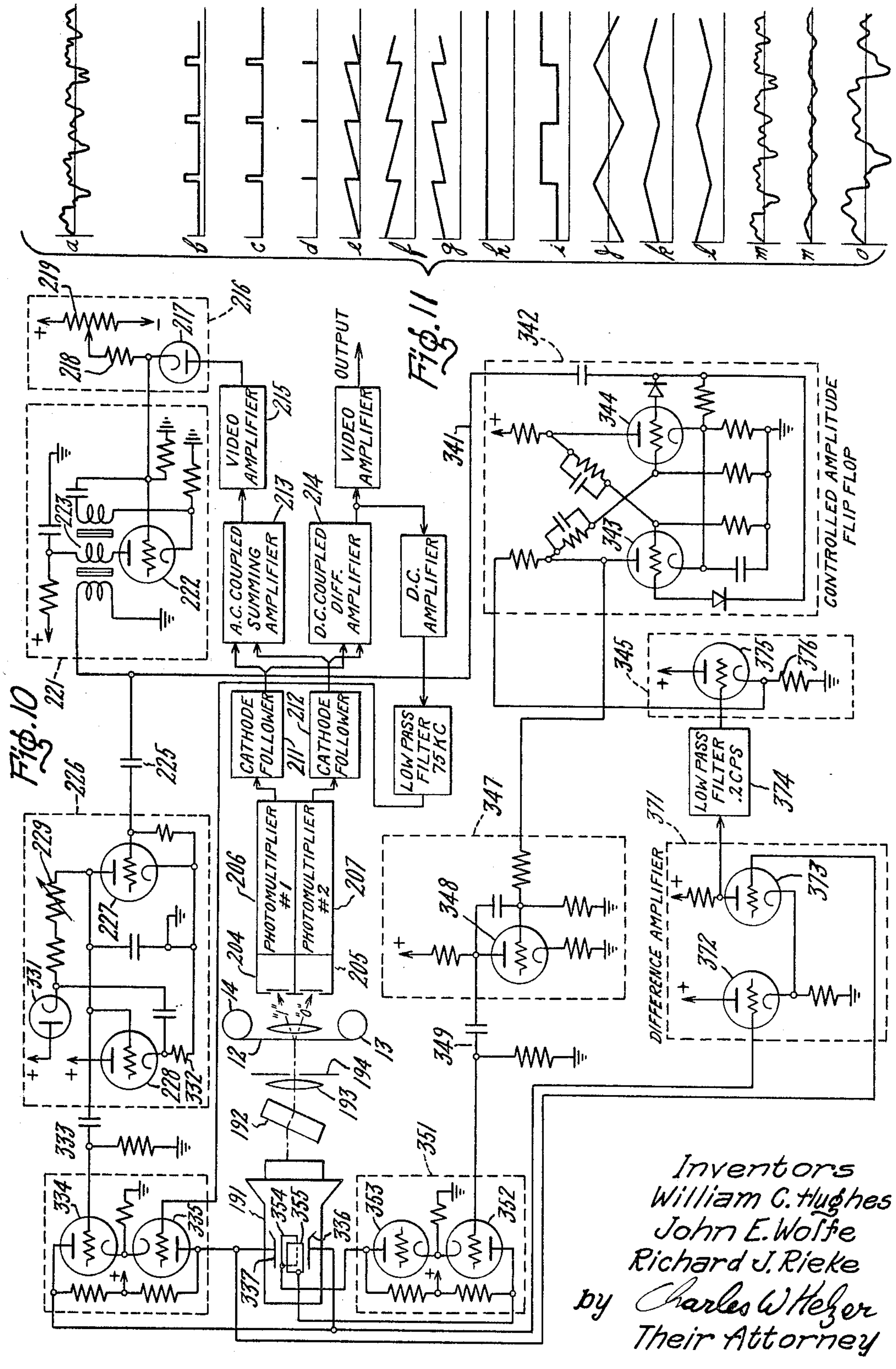

FIGURE 6*a* is a side view of the mechanical arrangement of a readout assembly for use in reading out data recorded by the transverse data recorder of FIGURE 4;

FIGURE 6*b* is a plan view of the readout system shown in FIGURE 6*a*;

FIGURE 6*c* is a plan view of a cam drive arrangement used to oscillate a glass lens comprising a part of the readout systems shown in FIGURES 6*a* and 6*b*;

FIGURE 7 is a cross-sectional view of a thermoplastic film tape illustrating the manner in which data tracks on the tape affect light rays passing therethrough;

FIGURE 8 is a plan view of a thermoplastic film tape having a data track impressed thereon by the transverse tape data recorder of FIGURE 4;

FIGURE 9 is a current output versus position characteristic of a servoing circuit comprising a part of the reading arrangement for use in reading out data recorded by the transverse tape recorder of FIGURE 4;

FIGURE 10 is a functional block diagram of the electrical circuitry used in developing the electric output signals produced by the readout arrangement of FIGURE 6*a*; and FIGURE 11 is a series of voltage versus time waveshape characteristics produced by the readout circuitry of FIGURE 10.

Figure 1:
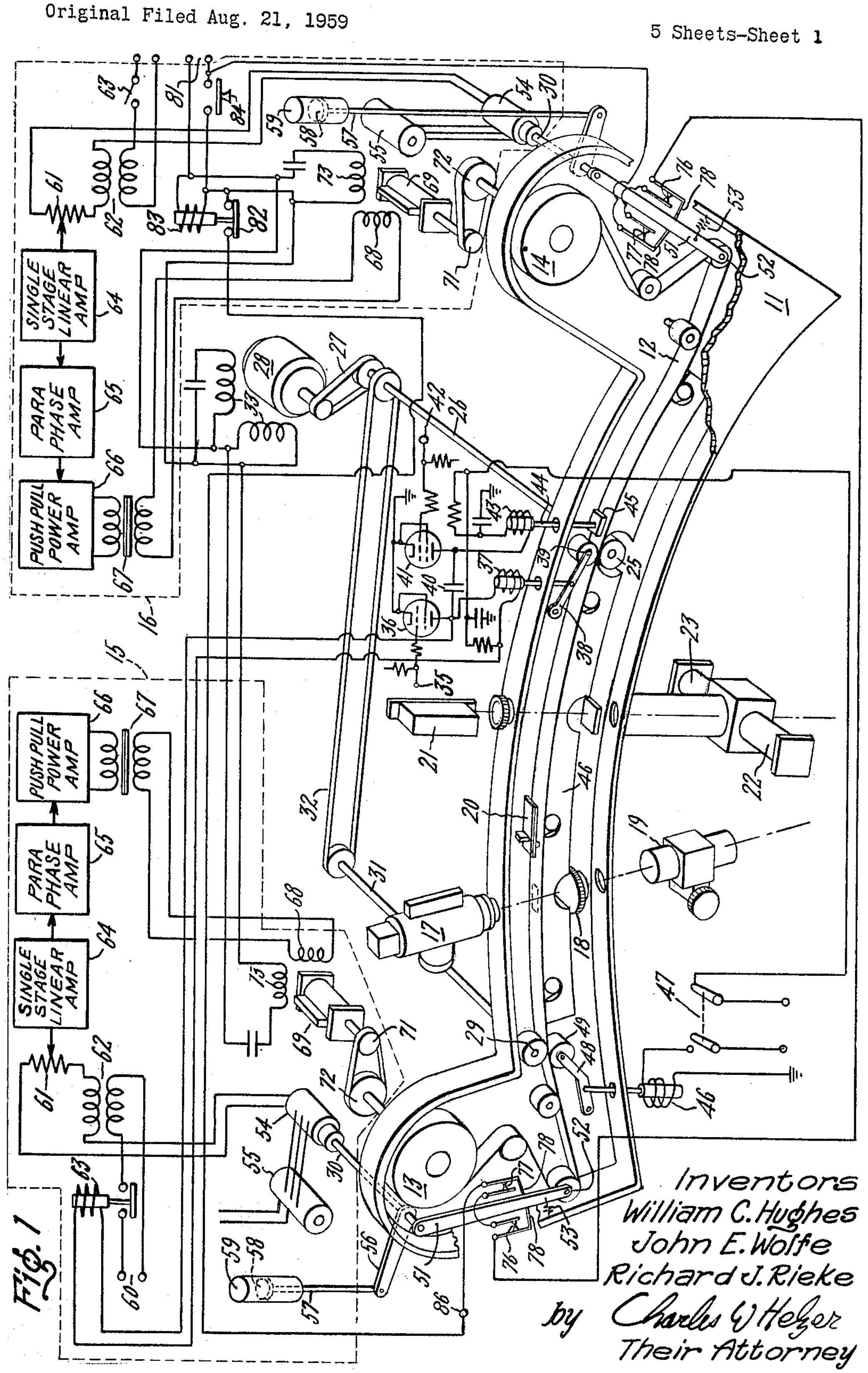
FIGURE 1 is a partially broken away perspective view of the new and improved thermoplastic film tape data recorder constructed in accordance with the invention.

A broken away perspective view of a thermoplastic film tape recorder constructed in accordance with the invention is illustrated in FIGURE 1 of the drawings. The tape recorder shown in FIGURE 1 includes an outer vacuum tight housing 11 fabricated from aluminum or other suitable light-weight metal. Supported within the housing 11 is a long thin, wide in comparison to its thinness tape 12 having a thermoplastic film surface. The tape 12 actually comprises a thin wide tape of Mylar or Cronar having a transparent conductive surface formed thereover, and a thermoplastic film surface covering the transparent conductive surface. One manner in which the tape 12 can be fabricated is disclosed more fully in U.S. Patent Number 3,113,179 entitled "Method and Apparatus For Recording," W. E. Glenn, Jr., inventor, filed February 15, 1960, assigned to the General Electric Company. The tape 12 is movably supported on a pair of reels 13 and 14 rotatably mounted on opposite ends of housing 11. To help in the explanation of the construction and operation of the tape recorder, it shall be assumed that the reel 14 shall be the forward take-up reel, and that the reel 13 shall be the reverse take-up reel. In order to drive the reverse reel 13, a servo mechanism indicated in the dotted outline box 15 is connected to the reel, and in order to drive the forward reel 14, a similar drive servo mechanism 16 is connected to the reel 14. The manner in which these mechanisms coact to drive the tape 12 forward or in the reverse direction to position any desired point along the tape at a particular location, will be explained more fully hereinafter.

In using the tape recorder, the tape 12 is first caused to move past an electron beam writing apparatus 17 which directs a fine writing electron beam through a suitable vacuum tight window in housing 11 down upon the tape in order to write intelligence patterns thereon in a manner to be described more fully hereinafter. To facilitate in aligning and focussing the electron beam produced by the electron beam writing apparatus 17 a viewing arrangement is provided which is formed by fluorescent screen and objective lens assembly 18, and an eyepiece viewing assembly 19 designed to give the operator a visual presentation of the writing electron beam size. After writing desired intelligence patterns on the thermoplastic film tape 12, the tape may be positioned below a readout means formed by a light source 21 mounted over a window in the housing 11 for projecting a beam of light down on the intelligence patterns formed in the thermoplastic film tape 12. This beam of light is then diffracted by the intelligence patterns in the thermoplastic film tape 12 so that the diffracted light passes through a field lens assembly and selective aperture plate where it is directed against either one of two photomultiplier tubes 22 and 23. Prior to moving the intelligence pattern under the readout assembly formed by light source 21 and photomultiplier tubes 22 and 23, the tape 12 is passed under a heating assembly 20. The heating electrode 20 is designed to heat the surface of the thermoplastic film tape 12 after electron beam patterns have been formed therein to cause the electron patterns to form permanent depressions in the tape which thereafter can act as diffraction patterns in the aforementioned manner as described with relation to the readout assembly formed by the light source 21 and the photomultiplier tubes 22 and 23.

The tape 12 is moved past the electron beam writing apparatus 17, the heating device 20, and the readout means 21–23 in the forward direction by a positive drive wheel 25 which is keyed to a shaft 26 driven by a pulley belt arrangement 27 and electric motor 28. Thermoplastic film tape 12 is moved in the reverse direction by a reverse drive wheel 29 keyed to a shaft 31 which in turn is driven by a pulley belt 32 having a drive wheel keyed to the shaft 26. By this arrangement, the direction of rotation of the two drive wheels 25 and 29 is the same, and are continuously rotated. The drive wheels 25 and 29 are started by means of a motor starting arrangement including a selector switch 84 which connects a 60 cycle alternating current supply across the windings of relay 83 which picks up and locks in through contact 82 and tape tension limit contacts 76 and 77, the action of which will be explained more fully hereinafter. Windings 33 of motor 28 are connected in parallel with relay 83 and are thereby energized at the same time as relay 33. By closing the switch 84, the motor 28 is caused to be rotated thereby causing the drive wheels 25 and 29 to be rotated continuously at approximately the same speed.

In order to cause the forward drive wheel 25 to positively drive the thermoplastic film tape 12 towards the forward takeup reels 14 it is necessary to cause the tape 12 to engage the drive wheel. For this purpose, a starting circuit arrangement is provided which includes an input terminal 35 to which a start forward direction signal is supplied. This signal is then applied across a voltage dividing biasing network formed by a pair of resistors to the control grid of a thyratron tube 36. The thyratron tube 36 is a conventional tube having its cathode grounded, and its anode electrode connected through the field winding of a solenoid 37 to a source of positive plate potential. The solenoid 37 has its armature connected to the midpoint of a pivoted lever arm 38 having a roller 39 mounted on the free end thereof. By this arrangement, upon a start forward drive signal being applied to the input terminal 35, sufficient current is drawn through the field winding of the solenoid 37 to cause its armature to drive the roller wheel 39 down into engagement with the thermoplastic film tape 12, and thereby force the tape 12 into engagement with the rotating forward drive wheel 25. As a consequence, the thermoplastic film tape 12 will be caused to move in the forward direction at a constant speed towards the forward takeup reel 14.

In the event it is desired to stop the movement of the thermoplastic film tape 12, a stopping circuit is provided. The stopping circuit includes a thyratron tube 41 having its cathode grounded, and its control grid connected to an input terminal 42 to which a stop signal pulse is applied. The anode of the tube 41 is connected through the field winding 43 of a solenoid to a positive direct current power supply. The anode of thyratron tube 41 is also connected through a coupling capacitor 40 to the anode of tube 36. By this arrangement, upon the application of a stop signal to terminal 42, and thence to the control grid of thyratron tube 41, this tube is rendered conductive so as to drop its plate voltage. This results in producing a negative going signal pulse on the anode of thyratron tube 36 which turns this tube off allowing the solenoid winding 37 to be deenergized thereby allowing a biasing spring (not shown) to lift the lever arm 38 and roller 39 away from contact with the thermoplastic film tape 12. Concurrently with this action, the current supplied to the field winding 43 causes the armature 44 of the solenoid to depress a brake shoe 45 against a backing member 46 extending along the inside of the housing 11, and against which the tape 12 is allowed to ride. As a consequence of this action the brake shoe 45 positively clamps the thermoplastic film tape 12 against the backing member 46 thereby immediately stopping it. The breaking circuit is such that a pulse applied to 35 for forward drive or switch 47 operated for reverse drive will release the brake shoe 45 so that the thermoplastic film tape 12 may again be moved in the forward direction by the forward drive wheel 25, or in reverse direction by the reverse drive wheel 29.

In order to cause the reverse drive wheel 29 to move the thermoplastic film 12 in the reverse direction towards the reverse takeup reel at a constant speed, a reverse drive circuit arrangement is provided. This reverse drive circuit arrangement is comprised by a solenoid 46 and a selector switch 47 connected across a source of direct current voltage having a value for example of 100 volts D.C., and an adequate current rating to energize the solenoid 46. Switch 46 also has a contact for releasing the brake shoe 45. The armature of the solenoid 46 is connected to the midpoint of a pivoted lever arm 48 having a roller 49 rotatably supported at its free end. Upon actuation of the selector switch 47 the solenoid armature drives the roller 49 into positive engagement with the reverse drive roller 29 with the thermoplastic film tape 12 disposed therebetween. As a consequence of this action the tape 12 is driven towards the reverse takeup reel 14 at a constant speed.

In order to drive the thermoplastic film tape 12 at a constant speed by either the forward drive roller 25 or the reverse drive roller 29, it is necessary that the tension on the thermoplastic film tape be maintained constant by the tape reel drive mechanisms 15 and 16. Because the tape reel drive mechanisms 15 and 16 for doing this job are identical in construction, and function in an identical manner to rotate their respective tape reels 13 and 14 to maintain the tension on the thermoplastic film tape 12 constant, only the tape reel drive mechanism 15 will be described in detail. It is to be understood however that the tape reel drive mechanism 16 will function in precisely the same manner to maintain the tension on the thermoplastic film tape 12 constant on the other side of the operating drive roller 39 or 49. In order to properly tension the thermoplastic film tape 12, a dancer arm 51 is provided having a roller 52 rotatably supported on the free end thereof about which a loop in the tape 12 is formed. The dancer arm 51 is pivotly mounted on housing 11, and is biased outwardly away from the tape 12 by a bias spring 53. The dancer arm 51 is set at a particular angle, and hence set to tension the thermoplastic film tape 12 at a particular value, by means of a spring 53 connected to the dancer arm 51. The selsyn transformer 54 is electrically connected to a selsyn generator 55. The connecting arm 56 from the selsyn transformer 54 is connected thru arm 56 and connecting rod 57 to a dash pot 58 and 59. The piston 58 and air cylinder 59 function to add mechanical damping to the dancer arm 51 position system. The angular position thus is then transmitted by the selsyn generator 55 and the selsyn transformer 54 to the secondary of the input transformer 62. The selsyn generator 55 and selsyn transformer 54 may comprise any conventional selsyn construction such as described in chapter 3 of the textbook entitled Servo Mechanism Practice by William R. Ahrendt, published by McGraw-Hill Publishing Company, 1954.

In order to maintain the dancer arm 51 set at a desired angular position as regulated by the adjustment of reference selsyn generator 55, and hence maintain the tension on the thermoplastic film tape 12 at a desired value, the rotor of the selsyn transformer 54 is electrically connected across an error signal developing resistor 61 connected in series with the secondary winding of an input transformer 62. The transformer 62 is connected in series with the output winding of selsyn 54 and is supplied with 60 cycle excitation voltage through relay 63 which is connected in parallel with actuating solenoid 37 such that the contacts of relay 63 close whenever the tape is being driven in the forward direction. The circuit including transformer 62 serves to increase the tension slightly in the tape 12 from reel 13 when the tape is being driven in the forward direction. The error developing resistor 61 is connected through an error amplifying network formed by a single stage linear amplifier 64 to a paraphase amplifier 65 that in turn is connected to the input of a push-pull power output amplifier 66. The single stage linear amplifier 64 may be of the type described on page 85 of the textbook by Seeley entitled Electronic Engineering, published by McGraw-Hill Publishing Company in 1958, paraphase amplifier 65 preferably is of the type described in the same Seeley textbook on page 330, and the push-pull power output amplifier is of the type described in a textbook entitled Active Networks by Rideout in chapter 8 thereof. The output error signal developed in the output of the push-pull power amplifier 66 is supplied through a matching output transformer 67 to one field winding 68 of an alternating current servo motor 69. The servo motor 69 has its rotor shafted to a pulley wheel 71 that in turn is connected by a pulley belt to a second pulley wheel 72 shafted to the reverse takeup reel 14. The servo motor 69 is also excited from a second field winding 73 disposed at right angles to the first field winding 68, and connected across a 60 cycle source of alternating current supply through relay 83. The switch contact 84 in conjunction with relay 83 comprises a portion of the starting and dropout protective circuit as partially described previously and to be described more fully hereinafter.

In operation the error signal developed by the selsyn generator 55 and selsyn transformer 54 produced when the tape 12 causes the dancer arm 51 to be shifted from its set position, is amplified in the amplifier stages 64, 65 and 66 and applied back to the servo motor 69 to cause the tape reel 14 to take up or pay out the tape 12 in a sufficient amount to maintain the position of the dancer arm 51 at its preset angular position. The dancer arm can be set in any position by manually adjusting the shaft position of selsyn 55. Thus it is possible to adjust both tension maintaining circuits such that they each maintain exactly the same tension on the tape. In this manner, the tension on the thermoplastic film tape 12 is maintained at a constant value. The servo mechanism circuit arrangement 16 is essentially the same as servo mechanism circuit arrangement 15 except insofar as the action of the circuit associated with transformer 62 is concerned. In servo mechanism circuit arrangement 16 transformer 62 is provided to introduce a small 60 cycle signal into the input of amplifier 64 when fast rewind is desired and initiated by closing switch 63 causing the reel drive servo mechanism 16 to allow tension arm 52 to move in a counterclockwise direction. This causes reel 13 to be driven in a clockwise direction by servo mechanism in an effort to keep the tape tension from decreasing. The result is that the tape is rapidly rewound from reel 14 onto reel 13.

In order to insure against improper tensioning of the thermoplastic film tape 12, over and under tension protection switches are provided on each of the dancer arms 51 comprising a part of the tape reel drive mechanisms. These protection switches are shown at 76 and 77, and comprise normally closed single pole switches having an extension 78 on the movable arm thereof which is adapted to engage the dancer arm 51 in the event it travels beyond the safe limits for its range of operation. The electric circuit formed through these over and under protection switches are connected in series with the holding contacts 82 of relay 83. The armature of the switch contacts 82 is driven by a field winding 83 that in turn is actuated by a start switch 84. From an examination of the starting switch it can be appreciated that upon the start switch 84 being closed the solenoid 83 will be actuated to close the switch contacts 82. Closure of the switch contacts 82 thereby will energize the servo motors 69 and 54 and the reel drive motor 54. The over protection feature is provided by the closure of the switch contacts 82 which are then connected through the normally closed protection switches 76 and 77 on the dancer arm 51 associated with the forward drive reel 14, and through protection switches 76 and 77 on the dancer arm 51 associated with the reverse drive 13. It can be appreciated that the closure of the switch contacts 82 will then provide a holding circuit for holding the starting circuit thereby energizing the tape drive mechanism. From the foregoing description it can be appreciated that closure of the start switch 84 will serve to energize the tape reel drive mechanisms 15 and 16 so that thereafter the tape recorder is conditioned for operation either in the forward or reverse directions by supplying a forward start or a reverse start signal pulse to the forward starting circuit 35 or to the reverse starting circuit 47 whichever the case may be. If, however, the tension should become so high or low as to allow contacts 77 or 76 to open relay 83 will drop out deenergizing motors 28, 54 and 69 stopping the tape.

Figures 2, 3:
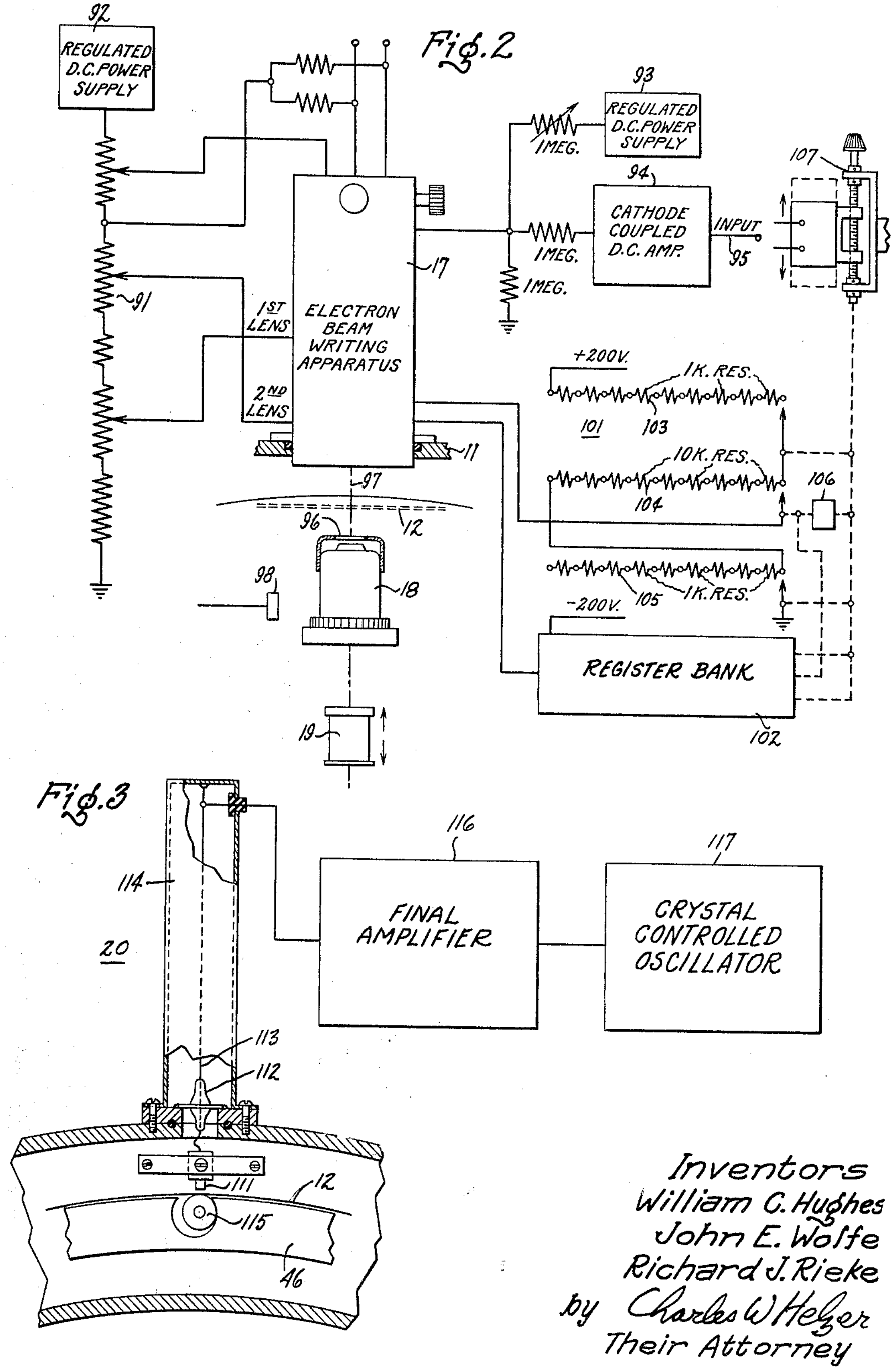
FIGURE 2 is a partial schematic circuit wiring diagram of the energization circuits for the electron beam writing apparatus comprising part of the tape data recorder shown in FIGURE 1.
FIGURE 3 is a cross-sectional view of a part of the housing of the tape data recorder shown in FIGURE 1, and illustrates the construction of the heating means comprising a part of the recorder.

The details of construction of one suitable form of construction for the electron beam writing apparatus 17 are illustrated in FIGURE 2 of the drawings. For a more detailed disclosure of the construction and operation of the electron beam writing apparatus per se reference is made to U.S. Patent No. 3,120,991, entitled "Thermoplastic Information Storage System," Sterling P. Newberry and James F. Norton, inventors, issued February 11, 1964, and assigned to the General Electric Company. The electron beam writing apparatus 17 includes a pair of lens assemblies (not shown) for focussing the electron beam and directing it upon the thermoplastic film tape 12 upon which the electron patterns are to be written. The lens assemblies are connected to a voltage divider network formed by a series of resistors 91 connected to a regulated direct current power supply source 92, and a one and one-half volt direct current filament supply source is connected directly to the cathode or electron emissive element of electron beam writing apparatus 17. The control grid or modulating electrode (not shown) of electron beam writing apparatus 17 is connected to a regulated direct current power supply source 93 across a resistive coupling network, and is connected through cathode coupled direct current amplifier 94 to a source of input modulating signals 95. The intelligence to be written on the thermoplastic film tape 12 is contained in the modulating signals applied to one of the deflection electrodes of the electron beam writing apparatus 17 as will be explained more fully in connection with FIGURE 4 of the drawings. The thermoplastic film tape is moved past the electron beam writing apparatus 17 at a constant speed so that the electrons are deposited on the tape 12. Prior to writing any electron patterns on the thermoplastic film tape 12 with the electron beam writing apparatus, however, the electron beams is initially aligned by temporarily removing the thermoplastic film tape 12, and causing the electron beam to impinge upon a fluorescent screen 96 aligned over a movable microscope objective lens assembly 18 which may be moved so as to position the fluorescent screen at the same location that the thermoplastic film would normally be. A movable eyepiece 19 is disposed to view the screen 96 through the objective lens assembly 18 in order to provide a visual indication of the beam spot diameter. Should it be desired to measure the beam current of the electron beam 97 a Faraday cage 98 is positioned to be moved into place on the electron beam to derive an output electrical indication of the value of the beam current. At these techniques and structural devices for electron beam characteristics are described fully in the above identified copending application of Newberry and Norton, a further description of the devices is believed to be unnecessary.

The heating means associated with the tape recorders shown in FIGURE 1 of the drawings is illustrated more fully in FIGURE 3. This heating means comprises a probe 111 which is electrically connected through a vacuum tight insulated bushing 112 to the central conductor 113 of an air line resonant tank circuit 114. The resonant tank circuit 114 is mechanically supported in vacuum tight relation on the exterior of a housing 11, and the conductive probe 111 is mechanically supported within the housing 11 on a suitable insulating shoulder made of a material such as Teflon. The probe 111 is supported immediately over the thermoplastic film tape 12 as it passes over a Teflon roller 115 rotatably supported within the drive member 46 so that the portion of the thermoplastic film tape 12 to be heated is disposed between the Teflon roller 115 and the conductive probe 111. The spacing of the conductive probe from the thermoplastic film tape 12 is preferably in the order of about 5 mils. The inner conductor 113 of the coaxial line 114 is connected through a suitable insulating bushing to the output stage of a final amplifier adjusted for operation in the neighborhood of 40 megacycles, and may be of the type described on page 396 of the 31st edition of the Radio Amateur's Handbook. The final amplifier 116 has its input connected to the output of a crystal controlled oscillator 117 designed to operate in the 50 megacycle region at preferably of the type described in the Radio Amateur's Handbook, 31st edition, published in 1954, on page 389.

In operation, the radio frequency oscillations developed by the crystal controlled oscillator are amplified by amplifier 116 and are supplied through the air line resonant tank circuit 113, 114 to the probe 111 where they are loaded by the conductive coating of the thermoplastic film 12 to cause the surface to become heated in accordance with the power dissipated in the conductive coating. The application of the heat to the electron patterns previously written on the thermoplastic film tape 12 causes the electrons to form permanent depression in the surface of the thermoplastic film tape 12 upon cooling in the manner described more fully in the above identified Patent Number 3,113,179 of William E. Glenn, Jr.

FIGURE 4 of the drawings illustrates the construction of the electron writer, and in which intelligence is recorded on the thermoplastic film tape transverse to the longitudinal axis of the tape. For this purpose the electron beam writing apparatus is adapted to properly deposit intelligence bearing patterns of electrons on the thermoplastic film tape shown at 12 as the tape is moved at a uniform velocity underneath the writing apparatus by the tape transport mechanism illustrated in FIGURE 1 of the drawings. Disposed over the thermoplastic film tape 12 is an electron beam writing apparatus indicated by the dotted lines 17, which is identical in construction to the electron beam writing apparatus disclosed in the above identified copending Newberry and Norton patent insofar as the high voltage supply circuits are concerned, which are connected to the accelerating anode control grid and the lens assembly of the electron beam writing tube 17. The writing circuit of FIGURE 4 of the drawings differ from the previously described wiring circuit, however, in the manner and type of electric circuitry connected to the horizontal and vertical deflection electrodes respectively. The deflection circuitry connected to electron beam writing tube 17 includes a blocking oscillator 161 for developing a basic clock frequency pulsed output signal that is supplied in parallel to a sawtooth generator 162, and to a flip flop trigger circuit circuit 163. The blocking oscillator 161 preferably comprises a circuit of the type disclosed on page 120 of the Radiation Lab Series Textbooks No. 2, and the sawtooth generator 162 may comprise a sawtooth generating circuit of the type disclosed in the above identified Seeley textbook on page 329. Fip flop circuit 163 may comprise a circuit of the type disclosed in the textbook by Millman and Taub entitled Pulse and Digital Circuits in chapter 5 thereof. The sawtooth generator 162 has its sawtooth wave form output potential supplied across a pair of voltage dividing resistors 164 and 165 to a push-pull driver stage 166. The push-pull driver stage 166 in turn has its output connected across the vertical deflection electrodes 167 of electron beam writing tube 17, and the voltage dividing resistors 164 and 165 are connected across a poteniometer resistor 168 used to provide operating bias to the push-pull driver stage 166. The push-pull driver stage 166 may comprise a cathode coupled paraphase amplifier of the type disclosed on pages 330 and 334 of the above identified Seeley textbook. In addition to being supplied to the push-pull driver stage 166, the output potential developed by the sawtooth generator 162 is also supplied back to a Schmitt trigger circuit 169 having its output connected to the input of the blocking oscillator 161 for controlling the height of the sawtooth wave form from sawtooth generator 162 by controlling the time of which the blocking oscillator 161 triggers to reset sawtooth generator 162. The Schmitt trigger circuit 169 may be of the the type disclosed in the textbook by Millman and Taub entitled Pulse and Digital Circuits in chapter 6 thereof. The flip flop 163 produces an essentially square wave output potential that is supplied to the input of an integrator circuit 171 of the type disclosed on page 175 of the above identified Seeley textbook. Integrator circuit 171 serves to convert the square wave potential supplied to the input thereof to an essentially triangular waveshape output potential that is supplied to a push-pull driver amplified 172 similar in construction to the push-pull driver 166. The push-pull driver amplifier 172 has an operating bias supplied thereto from a potentiometer resistor 173 and has its output connected across the horizontal deflection electrodes 174. Electric input signals representing the intelligence to be recorded on the thermoplastic film tape 12 are supplied through an input terminal 175 and video amplifier 176 where they serve to modulate the vertical deflection potential thereby impressing the intelligence contained in the input signal on the electron beam position. This results in modulating the position of the beam with the intelligence to be recorded. It is to be understood that the physical construction of the electron beam writing tube 17 and the manner in which it is mounted on a housing 11 of a tape transport mechanism such as that shown in FIGURE 1 is identical to the construction shown and described with relation to FIGURE 1. The electrical circuitry of the deflection circuits connected to the electron beam writing tube 17, however, will be as described above.

Figure 5:
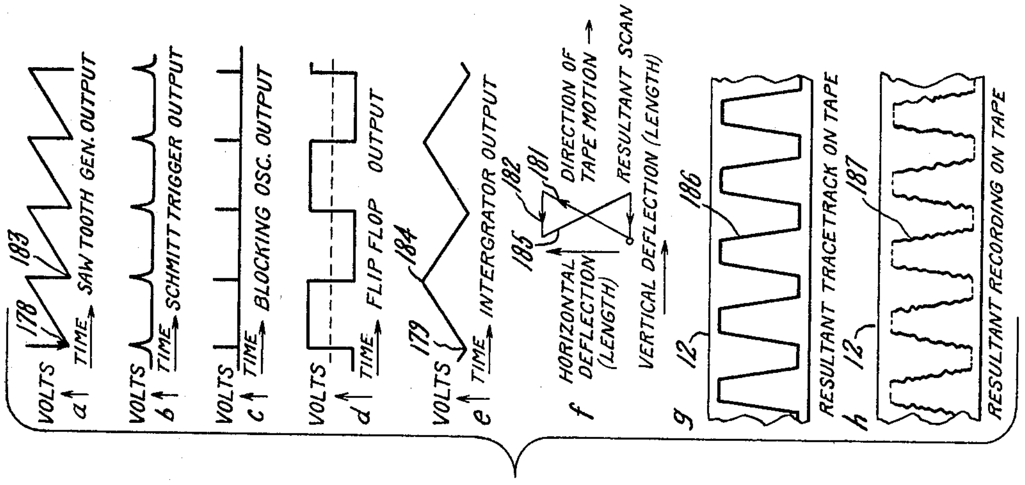
FIGURE 5 is a series of voltage waveshapes which are produced in the writing circuitry of FIGURE 4.

The voltage-time waveshapes illustrating the time relation of the various potentials produced by the components of the electron beam writing circuit of FIGURE 4 are illustrated in FIGURE 5. FIGURE 5*a* shows the waveshape of the sawtooth potential developed by sawtooth generator 162. FIGURE 5*b* illustrates the waveshape of the output potential produced by the Schmitt trigger 169, and FIGURE 5*c* shows the timing signal pulses produced at the output of the blocking oscillator 161. These clocking pulses are supplied to both the sawtooth generator 162 and to flip flop circuit 163 to synchronize the action of both the circuits. The waveshape of the output potential produced by flip flop circuit 163 is illustrated in FIGURE 5*d*. By comparison of FIGURE 5*d* to FIGURE 5*a* it can be seen that the square wave has twice the period of the sawtooth wave shape potential produced by sawtooth generator 162. The square wave potential of FIGURE 5*b* is then applied to the integrator circuit 171 which integrates the potential and produces the triangular output potential shown in FIGURE 5*e* which is applied to the horizontal deflection electrodes 174 of the electron beam writing gun 17. Simultaneously, the sawtooth waveshape potential shown in FIGURE 5*a* is applied to the vertical deflection electrode 167 of the electron beam writing gun 17. The combined effect of both the horizontal deflection potential and the vertical deflection potential applied to the deflection electrodes of electron beam writing gun 17 is shown in FIGURE 5*f* of the drawings. Referring to FIGURE 5*f* of the drawings it can be appreciated that at the time 178 in FIGURE 5*a* and 179 in FIGURE 5*b*, the vertical deflection electrodes will have the sawtooth waveshape form potential applied thereto and the horizontal deflection electrodes will have the increase in amplitude or positive half cycle of triangular waveshape potential applied thereto. The resultant effect of these two potentials will cause the electron beam of the electron beam writing tube 17 to trace over the path 181 in 5*f*. Upon reaching the end of the inclined portion of the sawtooth waveform potential, the electron beam of the writing tube will be caused to be returned by the retrace or vertical portion 182 by the steep wavefront portion of the sawtooth waveform potential applied to the vertical deflection electrode. At point 183 in FIGURE 5*a* of the drawings, and 184 in FIGURE 5*b* of the drawings, the combined potentials of the positive going sawtooth waveform potential applied to the vertical deflection electrodes and the negative going side of the triangular waveform starting at 184 applied to the horizontal deflection electrodes, will cause the electron beam to trace back across the path 185 in FIGURE 5*f* where, upon reaching the retrace or vertical portion of the sawtooth waveform potential, the beam will be caused to retrace to its original starting corner in the bow-tie shaped figure traced out by the electron beam path. Tracing out of this pattern, together with the movement of the tape towards the right of the drawings, will cause an electron pattern to be formed on the surface of the thermoplastic film 12 having a trapezoidal configuration as shown at 186. The intelligence signals to be recorded, which are supplied through the video amplifier 176 and push-pull driver 166, cause the electron beam position to be varied in accordance with the intelligence signals during the trace and retrace portions 181 and 185 respectively, so that an intelligence modulated track such as shown in 187 in FIGURE 5*h* will be produced on the surface of the thermoplastic film tape 12. It is to be understood that this track will be in the form of a depression in the surface of the thermoplastic film tape 12 where the intelligence modulating signals appear as deviations from the basic trapezoidal trace pattern shown at 186 in FIGURE 5*g*. By writing the data to be recorded on the surface of the thermoplastic film tape 12 in the manner shown in FIGURES 4 and 5 it is possible to record data at higher frequencies than with previously known recording systems, and to compress a great deal of data onto the tape. Considering the tape to be mechanically moved past the electron beam writing tube 17 at a tape speed of approximately 60 inches per second, and having a width of ¾ of an inch, then it is anticipated that the transverse scan lines will be approximately one half inch long, and will have a spacing of approximately 62 microns apart. With the tape laid out in this fashion it is anticipated that a recording density of about 1000 cycles per line can be obtained for analog recording, and a similar density of 1000 bits per line can be obtained for digital recording.

The optical arrangement of a reading system for use in reading out data recorded in the manner shown in FIGURE 5*h* of the drawings is illustrated in FIGURES 6*a* and 6*b*. FIGURE 6*a* shows a side view of the reading system which includes a flying spot scanner 191. The flying spot scanner tube 191 is positioned with its face confronting an oscillating glass lens assembly 192 which serves to refract light picked up from the face of the flying spot scanner down upon a field lens 193 that in turn serves to project the light through an apertured plate 194 upon the thermoplastic film tape 12. The flying spot scanner tube 191 is caused to trace out a complete raster of vertical lines which extend transverse to the longitudinal axis of the thermoplastic film tape 12, and this raster of lines is imaged upon the thermoplastic tape 12 by lens assembly 193 through the oscillating glass 192. The oscillating glass 192 is mounted on a cam follower 195 that in turn engages a cam 196 driven through a suitable gear box and synchronous motor drive arrangement 197 and 198 so that the glass plate 192 is caused to oscillate back and forth in conjunction with the scanning of the lines on the raster of the flying spot scanner tube face. In this fashion the duty cycle of the phosphors on the face of the flying spot scanner tube 191 is reduced. It is of course to be understood that the retentivity of the phosphors on the tube face of the flying spot scanner 191 is such that the light spot tracing out only a single line will be imaged through the field lens assembly 193 at any one time. Light projected by the lens assembly 193 upon the thermoplastic film tape 12 is transmitted through the tape 12 where it is modulated in intensity by the modulation signals recorded on the tape, and the intensity modulated signal emanating from the thermoplastic tape is focussed by a field lens assembly 199 upon an apertured plate 201. The apertured plate 201 has a pair of apertures 202 and 203 each of which provides an opening to a respective light integrating chamber 204 and 205, and which are separated by a light opaque stop 208. The light integrating chambers 204 and 205 are in turn connected to a pair of photomultiplier tubes 206 and 207, respectively. As will be explained more fully hereinafter, the read out arrangement will cause the scanning beam of light produced by the flying spot scanner to trace across the intelligence track 187 formed on the surface of the thermoplastic film tape as the tape is moved past the readout position at a constant speed where the light beam is caused to pass through it. As the light beam is traced along the basic trapezoidal trace 186 on the surface of the thermoplastic film tape the modulations on the trace will cause the light to be refracted into either the aperture 202 or 203 so that a varying amplitude output signal is obtained from the two photomultiplier tubes 206 and 207.

The complete readout system for causing the light beam produced on the face of the flying spot scanner tube 191 to trace across the generally trapezoidal trace configuration of the data recorded on the thermoplastic film surface of tape 12 is illustrated in FIGURE 10 of the drawings. In FIGURE 10, the flying spot scanner tube 191, as well as the thermoplastic film tape 12 and two photomultiplier tubes 206 and 207, are shown in the upper left hand corner of the drawings. Each of the photomultipliers 206 and 207 have their outputs connected through respective cathode follower output amplifiers 211 and 212 to the input of an A.C. coupled summing amplifier 213, and a D.C. coupled difference amplifier 214. The A.C. coupled summing amplifier may be of the type disclosed in the Seeley text on page 167 thereof, and the direct current coupled differential amplifier 214 may be of the type disclosed on page 161 of the above identified Seeley textbook. The output of the alternating current coupled summing amplifier 213 is connected to a video amplifier 215 of the type illustrated and described in the textbook entitled Television by Zworykin and Morton on page 538, and which has its output connected across a diode clipping circuit 216. The diode clipping circuit 216 is formed by diode 217 having its anode connected to the output of the video amplifier 215, and having its cathode connected through a cathode load resistor 218 to a potentiometer resistor 219. The output of the diode gating circuit 216 is connected to a blocking oscillator 221 of the type described more fully in the Radiation Laboratory Series Textbook, volume 22, on page 120. The diode clipping circuit 216 which is described more fully in the textbook by Millman and Taub entitled Pulse and Digital Circuits on page 111 has its output load resistor 218 connected to the control electrode of a triode discharge tube 222 comprising a part of the blocking oscillator 221. The blocking oscillator 221 is further comprised by a pulse transformer 223 which together with suitable biasing resistors and charging capacitors comprise the blocking oscillator 221. The blocking oscillator 221 when gated on by the diode clipping circuit 216 serves to develop a series of very sharp clock pulses which have a predetermined amplitude, and can be used as gating pulses for synchronization purposes.

The trigger pulses generated by the blocking oscillator 221 are supplied across a coupling capacitor 225 to a sawtooth sweep generator 226 of the type described in the above identified textbook by Seeley on page 329. This sawtooth sweep potential generator includes a pair of triode electron discharge tubes 227 and 228. The cathode of electron discharge tube 227 is connected directly to ground and its anode is connected through a variable load resistor 229 and blocking diode 331 to a source of direct current positive potential. The coupling capacitor 225 is connected directly to the control grid of electron discharge tube 227, and the control grid of electron discharge tube 228 is connected to the anode electrode of triode tube 227. The cathode of triode 228 is connected through a load resistor 332 to ground, and its anode is connected directly to a source of positive potential. By reason of this circuit arrangement, a sawtooth wave potential of the type shown in FIGURE 11*e* of the drawings will be generated by the circuit and is coupled through an R-C coupling network 333 to the control grid of an electron discharge tube 334. Electron discharge tube 334 together with a second electron discharge tube 335 comprises a push-pull driver amplifier of the type disclosed in the above identified Seeley textbook on page 334. For this purpose, the anodes of both electron discharge tubes 334 and 335 are connected through respective load resistors to a source of positive potential with the anode of discharge tube 334 being connected directly to the vertical deflection electrode 336 of flying spot scanner tube 191, and the anode of electron discharge tube 335 being connected to the vertical deflection electrode 337 of flying spot scanner tube 191. By this arrangement, the push-pull driver amplifier couples the sawtooth waveshape sweep potential to the vertical deflection electrodes of flying spot scanner tube 191.

The output trigger pulses developed by the blocking oscillator 221 are also coupled across the conductor 341 to a controlled amplitude flip flop square wave generator 342. The flip flop generator 342 is of the type describd in the above identified reference textbook by Millman and Taub on page 154 and is comprised by a pair of electron discharge tubes 343 and 344 with the conductor 341 being connected through a triggering circuit formed by a resistor, a capacitor and diode to the control grid of electron discharge tube 344. The cathode of both electron discharge tubes 343 and 344 are connected through a common load resistor to ground, and the anodes of electron discharge tube 344 is connected through a plate load resistor to a source of positive potential. The anode of electron discharge tube 343 is connected through a plate load resistor back to the cathode load resistor 376 of a cathode follower amplifier 345 the purpose of which will be described more fully hereinafter. The anode of both electron tubes 343 and 344 are connected back to the control grid electrode of the other tube through suitable resistance-capacitance coupling networks, and the control grid of electron discharge tube 343 is connected back to the coupling capacitor on conductor 341 through a decoupling diode. Accordingly, the control grids of both electron discharge tubes 343, 344 connected through decoupling diodes and coupling capacitor to the output of the blocking oscillator 221. The triggering network is provided with a separate resistor connected between the cathode of the electron discharge tube 344 and its load resistor and to the conductor 341. In operation the triode electron discharge tube of cathode follower amplifier 345 is normally conductive so that in effect a direct current positive potential is applied to the control anode electrode of triode 343. Normally in operation either one of the electron discharge tubes 343 or 344 will be conducting and the other will be cut off due to the feedback circuit of the control grid thereof. Accordingly, it is assumed that the electron discharge tube 343 is conducting and tube 344 will be cut off. If at that time a trigger pulse is supplied over the conductor 341 from blocing oscillator 221, this trigger pulse will be applied to the control electrode of electron discharge tube 344 rendering that tube conductive. Upon this occasion, feedback through the common cathode load circuit will cause the electron tube 343 to be cut off thereby raising the potential at the anode of electron tube 343. Electron tube 343 has its anode connected to the input of a triangular waveshape integrator type sweep generator 347.

The integrator type triangular waveshape sweep generator 347 is described more fully in the above identified textbook by Seeley on page 175 thereof, but essentially comprises an integrating circuit connected to the control electrode of an electron discharge tube 348 whose anode is connected through a coupling RC network 349 to a push-pull driver amplifier stage 351. The push-pull driver amplifier stage is comprised by a pair of electron discharge tubes 352 and 353 and is constructed in identical fashion to the push-pull driver amplifier stage 340. In operation, the blocking oscillator 221 produces trigger pulses which are applied to the controlled amplitude flip-flop square wave generator 342 to trigger or synchronize its operation. The control amplitude square waves produced by the generator 342 are then applied to the integrator triangular wave shape generator circuit 347 where they are converted to a triangular waveshape such as shown in FIGURE 11*j* of the drawings. This triangular waveshape is then applied to the push-pull driver amplifier stage 351, to the horizontal deflection electrodes 354 and 355 respectively, of the flying spot scanner tube 191. This triangular waveshape sweep potential, in conjunction with the sawtooth waveshape sweep potential applied to the vertical deflection electrodes will cause the electron beam and hence, the light spot on the face of the flying spot scanner tube 191 to trace out the basic bow tie shaped pattern shown in FIGURE 5*f* of the drawings, thus reproducing the trace of the trapezoidal data track 186 on the surface of the thermoplastic film tape 12. Accordingly, as the thermoplastic tape 12 is caused to move at a constant speed past the flying spot scanner readout tube 191, this bow tie shaped pattern being traced out by the light spot on the face of the tube in conjunction with the movement of the tape 12, will cause the light spot to follow along the trapezoidal shaped track 186 of data written on the thermoplastic film surface of tape 12. As the scanning beam of light produced by the flying spot scanner 191 is caused to trace across the trapezoidal track of data on the surface of tape 12, it will cause more or less light to fall on either one of the photomultiplier tubes 206 and 207, dependent upon the intelligence modulated on the track in the manner shown in FIGURE 5*h* of the drawings. This results in producing a variable amplitude output signal in the output of the photomultiplier tube 206 or 207 which is coupled to the cathode followers 211 and 212 to the D.C. coupled differential amplifier 214. The intelligence modulation on the signal thus derived is then supplied through a video amplifier output circuit 361 to the utilization device used with the recorder. Additionally, the output of the direct current coupled differential amplifier 214 is supplied to a direct current amplifier 362, having its output connected through a low pass filter 363 to the control grid of the push-pull driver amplifier tube 335 and the push-pull driver amplifier stage 340, connected to the vertical deflection electrodes of the flying spot scanner tube 191. By this arrangement, a very low frequency servoing signal can be derived for application to the deflection electrodes of the flying spot scanner tube 191 to cause the scanning beam of light produced by the flying spot scanner tube to servo in on the trapezoidal data track formed on the surface of the thermoplastic film tape 12.

The manner in which a servoing electric signal is derived and utilized by applying a voltage to the deflection electrodes of the flying spot scanner tube to cause the scanning beam of light to servo along the trapezoidal shaped data tracks can best be appreciated from an examination of FIGURES 7, 8 and 9 of the drawings. Referring to FIGURE 7, three cross-sectional views of the thermoplastic film tape 12 are illustrated, showing three possible conditions where the light beam depicted by the dotted line 365 passes straight through the center of the modulation depression or groove formed in the surface of the thermoplastic tape 12, and where the light beam is offset to one side or the other of the trapezoidal track. In the case where the light beam passes straight through the center of the trapezoidal track 186, no refraction occurs and the light will not be refracted into either one of the photomultiplier tubes 206 or 207, and hence, no difference output signal will be derived as a result of such refraction. In the second and third cases, however, the light beam is shown disposed to one side or the other of the center of the modulation groove 186 so that in the first case the light beam will be refracted to the viewer's left, and in the second case the light beam will be refracted to the viewer's right. In either situation, more light will fall on either the photomultiplier tube 206, or the photomultiplier tube 207, dependent upon which is the case. In this event, it can be appreciated that a difference output signal will be derived at the output of the difference amplifier 214. This difference output signal is then supplied through the D.C. amplifier 362 and low pass filter 363 which serves to filter out the modulation frequency imposed on the basic trapezoidal track 186, and to apply the filtered servo signal to the driver amplifier stage 340 for application to the vertical deflection electrodes of flying spot scanner 191. In this manner, the readout light beam spot can be made to center on the track 186 on the thermoplastic film surface of tape 12. This servoing arrangement also serves the purpose of reducing the duty cycle on the phosphorous of the face of the flying spot scanner tube 191 by allowing the oscillating glass 192 to be used. Through the use of the oscillating glass 192, a complete raster of lines may be used on the surface of phosphorous face of the flying spot scanner tube 191 and as the line moves up or down, whichever the case is, the oscillating glass serves to bring it back to its center point with respect to the lens structure 193. The servoing circuit, just described, insures that the vertical position of the lines in the raster will stay in synchronism with the oscillating glass plate 192 in that if the raster lines tend to get out of synchronism the servoing circuit operation just described will go into effect to cause the scanning beam of light to properly center on the trapezoidal data track 186 on the thermoplastic film surface of the tape 12.

The manner in which the flying spot scanner light beam initially picks out and starts tracking down the trapezoidal data pattern track 186 on the surface of thermoplastic film tape 12, is best depicted in FIGURE 8 of the drawings. Assuming the tape 12 to be moving upward in the plane of the drawings and that the light beam is turned on at the point 366 then, due to the action described with relation to FIGURE 7 of the drawings, the light beam will be slowly drawn over by the servoing circuit until it lines up with the track 186. If the light beam moves over and servos in the right direction along the track 186 so that it is synchronized with the track as it moves past the readout position, no difficulties are encountered. However, should the light beam move along the track such as is indicated at 367 in a direction opposite to that which it should take, the servo system automatically has built into it a safety feature to prevent the readout from occurring in the wrong direction. As is illustrated in FIGURE 8, the light beam will servo along a track such as indicated at 367 until it is brought into alignment with data track 186. As it travels along the data track, it will reach the cut-off point 368. At this point, its direction of movement is such that the light beam will go off on the tape where there is no data track formed. At this point, the total light intensity of the light reaching both photomultipliers will drop drastically so that a sharp drop in the overall amplitude of the signal produced by both photomultipliers 206 and 207 occurs. This sharp drop in ampitude will also occur at the output of the A.C. summing amplifier 213 and serves to trigger the diode 217 so as to result in triggering blocking oscillator 221. The triggering of blocking oscillator 221 will produce the sharp speed retrace portion of the sawtooth wave potential being supplied to the vertical deflection electrodes of the flying spot scanner tube 191 by sawtooth generator 226. This sharp retrace potential will, of course, follow the basic bow tie pattern so that the light beam is caused to jump from the point 368 to the predetermined point 369 which as is indicated in 8, is not along the trapezoidal data track 186. It can be appreciated that if the data track 186 were not trapezoidal at this point and that the point 369 were over the midpoint indicated by dotted line 371, that the servo would take over to again cause the light beam to cross over to the wrong data track 186 and again continue in the wrong direction. Thus, it would be possible to read out an entire tape in the wrong direction. However, because of the trapezoidal configuration of the data track, the point 369 falls on the correct side of the mid line 371 so that the readout light beam is caused to trace along a path such as is indicated at 372, back to the correct position on the data track 186 and it will at this time be traveling in the proper direction. Thereafter, upon the abrupt changes occurring in the direction of the data track 186 extending in the direction of the longitudinal axis of the film plastic tape 12, the jump of the readout light beam that occurs during the retrace portion of the sawtooth wave sweep potential, will cause the light beam to jump in the proper direction to cause it to properly read out the data modulated on the data track 186. FIGURE 9 of the drawings indicates the characteristic of the output of the difference amplifier relative to the position of the light spot on the surface of the thermoplastic film tape 12. If it is assumed that the zero position is the correct position to provide proper tracking along data track 186, it can be seen that variations from this zero position will produce a large amplitude output corrective signal to drive the light beam back onto its center position. However, should the light beam go beyond the limits "$\pi$" on either side the zero position as depicted by the mid point line 371, it is possible for the light beam to zero in on the improper center as previously described. Because of the trapezoidal configuration of the data track 186, such improper centering is prevented, and it is assured that when the readout assembly is first turned on, proper tracking of the data track will be rapidly established.

In order to prevent a large D.C. level from building up on the vertical deflection electrodes 336 and 337 of flying spot scanner tube 191 due to corrective voltages applied thereto by the servoing circuit formed by D.C. amplifier 362 and low pass filter 363, it is necessary to provide a means for eliminating the need of such corrective voltages. For this purpose, a difference amplifier 371 is provided which comprises a pair of electron discharge tubes 372 and 373. Electron discharge tube 372 has its control grid connected directly to the vertical deflection electrode 336, and the electron discharge tube 373 has its control grid connected directly to the vertical deflection electrode 337 of the flying spot scanner tube 191. As a consequence of this, an output potential will be developed across the output plate load resistor of triode 373 which is representative of any direct current difference in potential on the two deflection electrodes. This output signal is then supplied through a low pass filter 374 connected to the control electrode of cathode follower amplifier triode 375. The cathode follower amplifier triode 375 has its cathode load resistor 376 connected in the plate supply circuit of the triode 343 in the control amplitude flip flop generator 342. Thus, the signal supplied from the difference amplifier 371, controls the direct current bias supplied to the control grid of cathode follower amplifier 375 and accordingly, will control the amplitude of the output potential developed by the square wave generating flip flop amplifier 342. The effect of controlling the amplitude of this square wave potential is depicted in FIGURES 11*j* and 11*k* of the drawings wherein it can be seen that FIGURE 11*k*, the amplitude of the triangular wave shaped horizontal deflection potential is reduced. The effect of the reduction of this amplitude is to flatten out the bow tie shaped pattern of the scanning beam of electrons in the flying spot scanner tube 191 so as to, in effect, decrease the spacing of the vertical retrace portions 370 of the basic trapezoidal pattern traced out by the readout scanning beam of light on the face of the flying spot scanner tube 191. Varying the magnitude of this spacing therefore, corrects for the need for large direct current servoing potentials to be developed by the servoing circuit so as to prevent an accumulation of such direct current potentials which might, if accumulated sufficiently, cause the scanning beam of light to be deflected off the face of the flying spot scanner tube 191.

From the foregoing description it can be appreciated that the transverse recording embodiment of tape recorder provides a novel high density tape recorder wherein the high frequency response of the recorder can be greatly improved over previous tape recorders. It is anticipated that with a readout light spot diameter of approximately 1 mil, the upper frequency cutoff of the recorder will be in the neighborhood of 12 megacycles and the low frequency cutoff will be in the neighborhood of .15 megacycle. It is anticipated that a sweep rate in the neighborhood of 24 kilocycles can be used in tracing out and operating the readout system. If data is recorded on the basic trapezoidal data track 186, in analog fashion, by a width modulation of the groove, it is anticipated that these parameters prevail. It is also possible to modulate the depth of the groove by varying the magnitude of the electron charge used in writing the basic groove. This could be accomplished by modifying the writing circuits shown in FIGURE 4, to provide for modulation of the control grid in place of the vertical deflection electrode as disclosed in FIGURE 2. In this eventuality, it would be desirable to use a nominal depth for zero signal about which the depth would be modulated in accordance with the signal. For recording digital information a 1 might be recorded as an increase in depth whereas a 0 would be recorded as a decrease in depth. Recording the data in this fashion it is anticipated that some 1000 bits of information could be recorded on a single transverse line 186, and dependent upon the total length of the tape, since the transverse lines will be spaced apart approximately 62 microns, considerable density of information can be stored on a single tape. Accordingly, it can be appreciated that the transverse type recorder lends itself particularly to analog or digital recording where high frequency response is required.

Having described a preferred embodiment of a transverse type of thermoplastic film tape recorder constructed in accordance with the invention, it is believed obvious that many modifications and variations of the present invention are possible in the light of the above teachings. It is therefore to be understood that changes may be made in the particular embodiments of the invention described which are within the full intended scope of the invention as defined by the appended claims.

What we claim as new and desire to secure by Letters Patent of the United States is:

1. A data storage device including in combination a tape of solid impressionable thermoplastic film recording medium, an electron beam writing apparatus for impressing electrons on said tape in desired intelligence conveying patterns comprising a series of spaced apart marks extending along the tape transverse to the longitudinal axis of the tape, said electron beam writing apparatus including modulating means for laterally modulating the sides of the transversely extending series of spaced apart marks to thereby record the data to be stored, tape drive means for moving said tape in the direction of its longitudinal axis past said electron beam writing apparatus and for accurately positioning any desired point along the tape with respect to said electron beam writing apparatus, and servo control means for accurately controlling the operation of said tape drive means.

2. The combination set forth in claim 1 wherein the transversely extending laterally modulated intelligence conveying spaced apart marks are formed by first deflection circuit means connected to a first set of deflection electrodes of the electron beam writing apparatus, second deflection circuit means connected to a remaining set of deflection electrodes that are transverse to said first set of deflection electrodes of the electron beam writing apparatus, the first and second deflection circuit means coacting to cause the electron beam writing apparatus to trace out the transversely extending spaced apart marks as the tape of thermoplastic film recording medium is continuously moved past the electron beam recording apparatus, and means for applying a signal to be recorded to one of said deflection circuit means for laterally modulating the sides of the transversely extending spaced apart marks to thereby record the data to be stored.

3. The combination set forth in claim 1 further characterized by electro-optical readout means comprising a scanning device for producing a scanning beam of light for scanning across the intelligence conveying patterns on said tape, a pair of photoelectric devices for viewing said tape, an apertured plate disposed intermediate said tape and said photoelectric devices for selectively passing light emanating from said tape to said photoelectric devices, and feedback means operatively coupled between said scanning device and said photoelectric devices for causing said scanning device to track the transversely extending series of spaced apart laterally modulated marks formed on said tape.

4. A data storage device including in combination a tape of solid impressionable thermoplastic film recording medium having intelligence conveying patterns comprising a series of spaced apart laterally modulated marks extending along the tape transverse to the longitudinal axis of the tape, electro-optical readout means comprising a scanning device for producing a scanning beam of light for scanning across the intelligence conveying patterns on said tape, a pair of photoelectric devices for viewing said tape, an apertured plate disposed intermediate said tape and said photoelectric devices for selectively passing light emanating from said tape to said photoelectric devices, feedback means operatively coupled between said scanning device and said photoelectric devices for causing said scanning device to track the transversely extending series of marks formed on said tape, and servo controlled tape drive means for moving said tape past said readout means in the direction of its longitudinal axis and for accurately positioning any desired point along the tape with respect to said readout means.

5. A data storage device including in combination a tape of solid impressionable medium, a radiant energy writing apparatus for producing a beam of radiant energy and for writing a series of spaced apart intelligence conveying marks which extend along the tape transverse to the longitudinal axis of the tape with the beam of radiant energy, the radiant energy writing apparatus including modulating means for laterally modulating the sides of the transversely extending series of spaced apart marks to thereby record the data to be stored on the tape of solid impressionable medium with the radiant energy, tape drive means for moving the tape in the direction of the longitudinal axis past the radiant energy writing apparatus and for accurately positioning any desired point along the tape with respect to the radiant energy writing apparatus, and servo control means for accurately controlling the operation of the tape drive means.

6. The combination set forth in claim 5 further characterized by readout means comprising a radiant energy scanning device for producing a scanning beam of radiant energy for scaning across the spaced apart intelligence conveying marks on said tape of solid impressionable recording medium, a pair of radiant energy responsive devices for viewing said tape, an apertured plate disposed intermediate said tape and said radiant energy responsive devices for selectively passing radiant energy emanating from said tape to said radiant energy responsive devices, and feedback means operatively coupled between said radiant energy scanning device and said radiant energy responsive devices for causing said radiant energy scanning device to track the transversely extending series of spaced apart laterally modulated intelligence conveying marks formed on said tape.

7. A data storage device including in combination a tape of solid impressionable medium having intelligence conveying patterns comprised by a series of spaced apart laterally modulated marks extending along the tape transverse to the longitudinal axis of the tape, readout means comprising a radiant energy scanning device for producing a scanning beam of radiant energy for scanning across the intelligence conveying marks on said tape, a pair of radiant energy responsive devices for viewing said tape, an apertured plate disposed intermediate said tape and said radiant energy responsive devices for selectively passing light emanating from said tape to said radiant energy responsive devices, feedback means operatively coupled between said radiant energy scanning device and said radiant energy responsive devices for causing said radiant energy scanning device to track the transversely extending series of spaced apart intelligence conveying marks formed on said tape, and servo controlled tape drive means for moving said tape past said readout means in the direction of its longitudinal axis and for accurately positioning any desired point along the tape with respect to said readout means.

8. A data storage device including in combination a tape of solid impressionable recording medium, radiant energy writing means for producing a writing beam of radiant energy and impressing the beam of radiant energy on the tape of solid impressionable recording medium in a series of spaced apart intelligence conveying marks which extend along the tape transverse to the longitudinal axis of the tape, the radiant energy writing means including modulating means for laterally modulating the sides of the transversely extending series of spaced apart marks to thereby record the data to be stored on the tape of solid impressionable medium, tape drive means for moving the tape at least in the direction of its longitudinal axis past the radiant energy writing apparatus and for accurately positioning any desired point along the tape with respect to the radiant energy writing apparatus, servo control means for accurately controlling the operation of the tape drive means, heating means for heating the tape of solid impressionable recording medium after impression of the radiant energy patterns thereon to permanently set the patterns thereby to form radiant energy modifying marks on the tape, and radiant energy readout means for inspecting portions of the tape having radiant energy modifying marks formed thereon in intelligence conveying pattern and deriving an output electrical signal indicative of such intelligence.

References Cited by the Examiner

UNITED STATES PATENTS

| | | | |
|---|---|---|---|
| 2,391,451 | 12/1945 | Fischer | 178—7.5 |
| 2,985,866 | 5/1961 | Norton | 340—173 |

BERNARD KONICK, *Primary Examiner.*

IRVING SRAGOW, *Examiner.*

T. W. FEARS, *Assistant Examiner.*